United States Patent
Sarisky et al.

(10) Patent No.: US 11,005,972 B2
(45) Date of Patent: May 11, 2021

(54) SYSTEMS, METHODS, AND COMPUTER PROGRAM PRODUCTS TO IMPLEMENT CHANGES IN A CONVERGED INFRASTRUCTURE SYSTEM

(71) Applicant: NetApp, Inc., Sunnyvale, CA (US)

(72) Inventors: Daniel Sarisky, Cary, NC (US); Devon Snyder, Cary, NC (US); David Gelvin, Boulder, CO (US); Antonio Abbondanzio, Raleigh, NC (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/600,773

(22) Filed: Oct. 14, 2019

(65) Prior Publication Data
US 2020/0344325 A1    Oct. 29, 2020

Related U.S. Application Data

(60) Provisional application No. 62/838,045, filed on Apr. 24, 2019.

(51) Int. Cl.
| | |
|---|---|
| *H04L 12/24* | (2006.01) |
| *H04L 29/12* | (2006.01) |
| *H04L 29/08* | (2006.01) |
| *G06F 9/445* | (2018.01) |

(52) U.S. Cl.
CPC .......... *H04L 67/34* (2013.01); *G06F 9/44568* (2013.01); *H04L 41/0672* (2013.01); *H04L 41/082* (2013.01); *H04L 41/0816* (2013.01); *H04L 67/1097* (2013.01)

(58) Field of Classification Search
CPC . H04L 67/34; H04L 67/1097; H04L 41/0672; H04L 41/0816; H04L 41/082; G06F 9/44568
USPC ........................................................ 709/221
See application file for complete search history.

(56) References Cited

U.S. PATENT DOCUMENTS

| | | | |
|---|---|---|---|
| 6,789,215 | B1 | 9/2004 | Rupp et al. |
| 7,512,584 | B2 | 3/2009 | Keith, Jr. |
| 7,870,242 | B2 | 1/2011 | Nguyen |
| 8,661,534 | B2 | 2/2014 | Chatterjee et al. |

(Continued)

OTHER PUBLICATIONS

Cisco, FlashStack Mini Converged Infrastructure Solution Design Guide for VMware Horizon 7, Pure Storage Inc, Jul. 2016, pp. 1-88.

(Continued)

*Primary Examiner* — Ruolei Zong
(74) *Attorney, Agent, or Firm* — Haynes and Boone, LLP (57) ABSTRACT

A non-transitory machine readable medium having stored thereon instructions for performing a method comprising machine executable code which when executed by at least one machine, causes the machine to: receive a schema with a tag and a parameter, the schema representing a change to be made to a converged infrastructure environment, wherein the schema is received from a cloud-based service to the on-site converged infrastructure environment; select an executable script template from a store of executable script templates using the tag; generate an executable script from the executable script template, including populating the executable script template with the parameter; and run the executable script against a component of the converged infrastructure environment.

20 Claims, 7 Drawing Sheets

(56) References Cited

U.S. PATENT DOCUMENTS

| | | | |
|---|---|---|---|
| 8,707,385 B2 | 4/2014 | Jain et al. | |
| 8,762,508 B2 | 6/2014 | Shah et al. | |
| 8,862,941 B2 | 10/2014 | Whitlock et al. | |
| 9,483,281 B2 | 11/2016 | Bonczkowski et al. | |
| 9,684,539 B1 | 6/2017 | Cuthrell et al. | |
| 10,027,711 B2 | 7/2018 | Gill et al. | |
| 10,148,758 B2 | 12/2018 | Sarisky et al. | |
| 10,177,988 B2 | 1/2019 | Maes | |
| 10,216,548 B1* | 2/2019 | Zhang | G06F 9/541 |
| 10,686,659 B1* | 6/2020 | Gong | H04L 41/0869 |
| 2013/0073704 A1 | 3/2013 | Whitlock et al. | |
| 2013/0339841 A1* | 12/2013 | Petti | G06F 40/14 |
| | | | 715/234 |
| 2014/0298462 A1 | 10/2014 | Stuntebeck et al. | |
| 2015/0220330 A1* | 8/2015 | Borden | G06F 8/71 |
| | | | 717/121 |
| 2017/0295059 A1* | 10/2017 | Necas | H04L 41/0806 |
| 2018/0241642 A1* | 8/2018 | Patel | G06F 8/60 |
| 2018/0248758 A1* | 8/2018 | Ali | H04L 41/0866 |
| 2018/0293066 A1* | 10/2018 | Ali | G06F 9/4411 |
| 2019/0146861 A1 | 5/2019 | Joshi et al. | |
| 2019/0190953 A1 | 6/2019 | Feintuch | |

OTHER PUBLICATIONS

Dell EMC, Dell EMC Vision Intelligent Operations, 2016, 2 pages. Retrieved from the Internet:URL: (https://www.emc.com/collateral/data-sheet/vision-intelligent-operations-software-data-sheet.pdf).

VCE Data Sheet, VCE Vision ™ Intelligent Opeartions, 2015, 2 pages. Retrieved from the Internet:URL: (https://www.emc.com/collateral/data-sheet/vce-vision-software-data-sheet.pdf).

Cisco, Converged Infrastructure, 4 pages. 2019. Retrieved from Internet: URL: (https://www.cisco.com/c/en/us/solutions/data-center-virtualization/converged-infrastructure/index.ht . . . ).

Cisco, FlashStack™—Cutting Edge Converged Infrastructure, Pure Storage, 2 pages. 2018. Retrieved from the Internet:URL:(https://www.purestorage.com/solutions/infrastructure/flashstack.html).

IBM, VersaStack, 4 pages. 2019. Retrieved from Internet: URL: (https://www.ibm.com/in-en/marketplace/versastack).

Microsoft, Azure Stack: Hybrid Cloud Your Way, 4 pages. 2019. Retrieved from the Internet:URL: (http://azure.com/azurestack).

Vmware, Hyperconverged Infrastructure, 6 pages. 2019. Retrieved from Internet: URL: (https://www.vmware.com/products/hyper-converged-infrastructure.html).

* cited by examiner

SYSTEMS, METHODS, AND COMPUTER PROGRAM PRODUCTS TO IMPLEMENT CHANGES IN A CONVERGED INFRASTRUCTURE SYSTEM

RELATED APPLICATIONS

The present application claims the benefit of U.S. Provisional Patent Application No. 62/838,045, filed Apr. 24, 2019, and entitled "SYSTEMS, METHODS, AND COMPUTER PROGRAM PRODUCTS TO PROVIDE DYNAMIC PLAYS IN A CONVERGED INFRASTRUCTURE SYSTEM," the disclosure of which is incorporated by reference herein in its entirety.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Converged infrastructure environments with compute, networking and storage nodes are becoming useful for data centers. Continuous efforts are being made to efficiently configure and deploy storage nodes in such an environment.

DETAILED DESCRIPTION

Some converged infrastructure environments include a multitude of rules, which when followed, implement a reference system that is a known-good system. When a user configures the converged infrastructure, they may fail to conform to some of the rules. The customer may then manually handle those differences by mapping the differences to a set of commands or steps targeted at one or more devices to remediate those issues. However, this can be time-consuming and error-prone when attempting to fix the issue across several components in the converged system.

Accordingly, there is a need for ease-of-use when conforming a system to a set of rules implementing a reference system.

Various embodiments aid a user in conforming the converged infrastructure system to a set of rules by providing a set of remediation schemas, each of the remediation schemas being operable to remediate at least one failure, wherein a failure includes a difference between a configured system and rule. A cloud-based validation utility may validate a configured converged infrastructure system against a set of rules, marking each difference between a rule and a configuration as a failure. For a given failure, the system may select a schema to be populated with a parameter (e.g., a node name) either automatically based on a result of validating the rule or through user input. Once the schema is populated with appropriate parameters, it may be passed to an on-premises data center having a configuration utility, which matches the populated schema to an executable script. Once the configuration utility matches the populated schema to an executable script, it fills in any appropriate parameters within the executable script and then causes that executable script to be executed in the system, thereby remediating the failure. Other remediation schemas may be matched to other executable scripts, so that the sets of the remediation schemas and the executable scripts provide for automated failure remediation.

Various embodiments provide for a user accessing the failure remediation tools through an interface via a public or private cloud that is separate from the on-premises data center, and the remediations are applied to the on-premises data center.

In some examples, each rule may generate the parameters dynamically based on the analytics (such as failed rules) so that the filled-in schema can be combined with operation tags to securely generate executables (e.g., automation plays) to perform operations to conform to best practice configuration across the converged system. The design may allow for the user to leverage from a software as a service (SaaS) portal that may be executed on the on-premises resources.

Furthermore, various embodiments may be used to apply updates to a converged infrastructure system, provision or remove compute or storage resources, or make any other configuration changes. Specifically, in some embodiments an update or configuration change may not correspond to a rule failure and, instead, may be selected by a user separate and apart from any identified failure.

While the examples below refer to the cloud-based validation utility, it is noted that other embodiments may perform the validation on-premises. In other words, the scope of embodiments may perform the validation in the cloud, on-premises, or other appropriate location. Furthermore, while the examples below refer to a Converged Infrastructure (CI), the scope of embodiments is not so limited. Rather, various embodiments may be applicable to a Hyper Converged Infrastructure (HCI) or other systems that fall under the Converged Systems (CS) umbrella.

Various embodiments provide advantages over some systems. In one example, a converged infrastructure environment provides ease-of-use for a human administrator. Rather than manually identifying rules failures or updates and manually generating and applying scripts, various embodiments include a variety of pre-programmed remediations and updates that may be applied through user selection of the failure or update itself and without manual identification or generation of scripts. Such embodiments may not only provide efficiency to a human administrator, but they may improve the operation of the CI system by facilitating prompt fixes and updates to the CI system and reducing or eliminating administrator errors that would otherwise occur with manual identification and generation of scripts.

Furthermore, splitting the responsibilities for validation and implementation between a cloud-based validation utility and an on-premises CI environment may improve operation of the CI environment. Specifically, the cloud-based validation utility may provide a central resource for tracking updates and storing a knowledge base of rules, failures, and schemas to implement updates and fixes. Therefore, in an example in which a CI environment may be expected to be subject to updates once per day or more, the cloud-based validation utility may use its resources to keep track of the updates and determine which CI environments correspond to the updates. Furthermore, since storage resources and compute resources are generally expected to be cheaper and more plentiful in the cloud, the cloud-based validation utility may reduce demand on the on-premises CI environment by storing inventories and rules, performing the computation necessary to identify available updates and fixes, generating schemas corresponding to updates and fixes, and tracking update/fix status of a multitude of different CI environments.

Figure 1A:
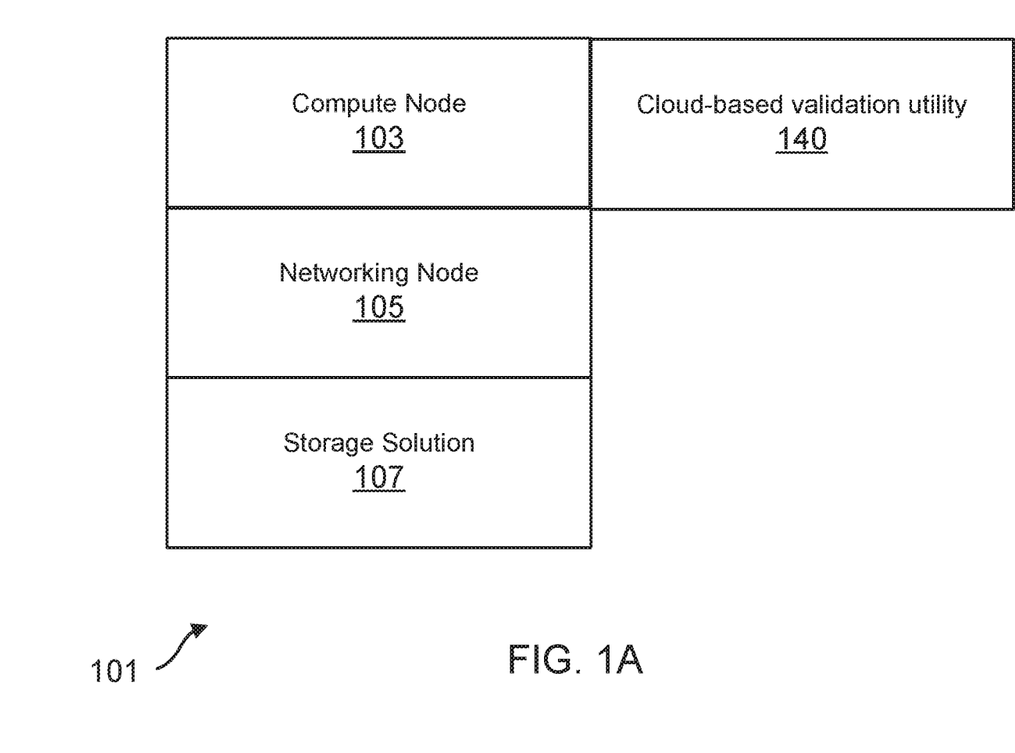
FIGS. 1A-B illustrate an example converged infrastructure environment in which various embodiments may be implemented.

FIG. 1A shows a high-level block diagram of a CI environment 101 (also referred to as CI 101) in which various embodiments may be implemented. CI environment 101 includes a compute node 103, a networking node 105 and a storage solution 107. The CI 101 may also communicate with a cloud-based validation utility 140.

In one aspect, CI 101 provides an integrated computing, networking and storage solution for a data center. The compute node 103 may include one or more servers that execute one or more applications, for example, an email, database or any other application.

The networking node 105 enables the compute node 103 to access the storage solution 107. The networking node 105 at least includes a switch and the storage solution 107 includes a storage system with a plurality of storage devices managed by a storage operating system, as described below in detail.

In one aspect, the CI 101 configuration is validated/certified to meet certain performance and resiliency requirements. This enables data centers to have predictable performance and easy to deploy solutions.

One example, of a CI 101 is FlexPod® (without derogation of any third-party trademark rights) that are based on servers and switches that are provided by Cisco Systems, Inc. and storage solutions that are provided by NetApp Inc., the assignee of the present application. The various features and functionality disclosed herein are not limited to any specific CI or CI configuration.

Figure 1B:
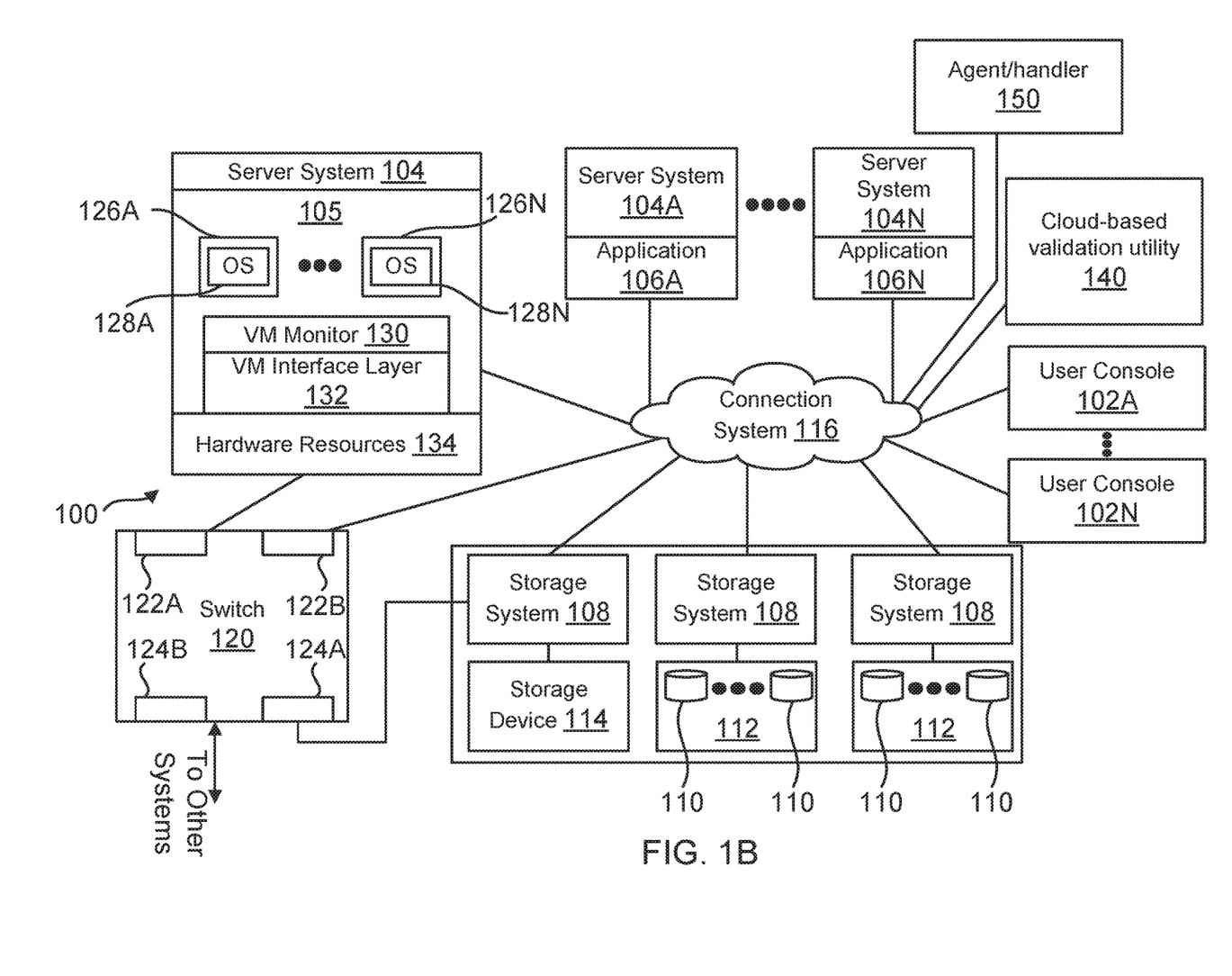

FIG. 1B shows an example of a networked operating environment 100 (also referred to as system 100) with various components that can be used at CI 101, in one aspect of the present disclosure. As an example, system 100 may include one or more computing systems 104A-104N (may also be referred to and also shown as server system 104 or as host system 104) that are part of the compute node 103 of CI 101. The server systems 104 may access one or more storage systems 108 that are part of storage solution 107 via a connection system 116 such as a local area network (LAN), wide area network (WAN), the Internet and others. The server systems 104 may communicate with each other via connection system 116 (part of networking node 105), for example, for working collectively to provide data-access service to user consoles 102A-102N (may be referred to as user 102) and/or to host systems 104.

One or more switch 120 (part of networking node 105) may be used for communication between server systems 104 and storage systems 108/storage device(s) 114. The switch 120 may include a plurality of ports 122A-122B and 124A-124B, having logic and circuitry for handling network packets. For example, port 122A is coupled to host 104, port 122B is coupled to connection system 116 and port 124A is coupled to storage system 108 and port 124B may be coupled to other systems, for example, other switches, respectively. It is noteworthy that although only one port is shown as being connected to the storage system 108, multiple ports may be used for that connection for redundancy or any other reason.

Server systems 104 may be computing devices configured to execute applications 106A-106N (referred to as application or applications 106) over a variety of operating systems, including the UNIX® and Microsoft Windows® operating systems. Applications 106 may utilize data services of storage system 108 to access, store, and manage data in a set of storage devices 110/114 that are described below in detail. Applications 106 may include an email exchange application, a database application or any other type of application. In another aspect, application 106 may comprise a virtual machine as described below in more detail.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment 105, according to one aspect. In the virtual machine environment 105 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 105 executes a plurality of VMs 126A-126N. VMs 126A-126N execute a plurality of guest OS 128A-128N (may also be referred to as guest OS 128) that share hardware resources 134. As described above, hardware resources 134 may include CPU, memory, I/O devices, storage or any other hardware resource. Some embodiments may omit virtual execution environment 105 and use applications running on bare-metal or in containers. In other words, the scope of embodiments is not limited to a virtual execution environment, and some embodiments may include both virtual environments and run bare-metal.

A virtual machine monitor (VMM) 130, for example, a processor executed hypervisor layer provided by VMWare Inc., Hyper-V layer provided by Microsoft Corporation (without derogation of any third party trademark rights) or any other layer type, presents and manages the plurality of guest OS 128A-128N. VMM 130 may include or interface with a virtualization layer (VIL) 132 that provides one or more virtualized hardware resource 134 to each guest OS. For example, VIL 132 presents physical storage at storage devices 110/114 as virtual storage (for example, as a virtual hard drive (VHD)) to VMs 126A-126N. The VMs use the VHDs to store information at storage devices 110/114.

In one aspect, VMM 130 is executed by server system 104 with VMs 126A-126N. In another aspect, VMM 130 may be executed by an independent stand-alone computing system, often referred to as a hypervisor server or VMM server and VMs 126A-126N are presented via another computing system. It is noteworthy that various vendors provide virtualization environments, for example, VMware Corporation, Microsoft Corporation (without derogation of any third-party trademark rights) and others. The generic virtualization environment described above with respect to FIG. 1A may be customized depending on the virtual environment provider.

System 100 may also include the cloud-based validation utility 140 for managing and configuring various elements of system 100. Cloud-based validation utility 140 may include one or more computing systems for performing various tasks described below in detail. Details regarding cloud-based validation utility 140 are provided below in more detail.

System 100 may also include one or more user consoles 102A-102N referred to as users. Users' 102A-102N may access server system 104 for storage related services provided by storage system 108 and also use cloud-based validation utility 140 described below in detail.

In one aspect, storage system 108 includes one or more nodes with access to a set of mass storage devices 110 (may be referred to as storage devices 110) within a storage subsystem 112. Storage system 108 may also access storage devices 114 via another switch (not shown) that may be a Fibre Channel, Fibre Channel over Ethernet or any other type of switch. Storage devices 110 and 114 are referenced interchangeably throughout this specification. As an example, storage devices 110 and 114 may be a part of a storage array within the storage sub-system.

Storage devices 110/114 are used by storage system 108 for storing information. The storage devices 110/114 may include writable storage device media such as magnetic disks, video tape, optical, DVD, magnetic tape, non-volatile memory devices for example, self-encrypting drives, flash memory devices and any other similar media adapted to store information. The storage devices 110/114 may be organized as one or more groups of Redundant Array of Independent (or Inexpensive) Disks (RAID). The aspects disclosed herein are not limited to any particular storage device or storage device configuration.

In one aspect, to facilitate access to storage devices 110/114, a storage operating system of storage system 108 virtualizes the storage space provided by storage devices 110/114. The storage system 108 can present or export data stored at storage devices 110/114 to server systems 104 and VMM 130 as a storage volume or one or more qtree sub-volume units. Each storage volume may be configured to store data files (or data containers or data objects), scripts, word processing documents, executable programs, and any other type of structured or unstructured data. From the perspective of the VMs/server systems, each volume can appear to be a single storage drive. However, each volume can represent the storage space in one drive, an aggregate of some or all of the storage space in multiple drives, a RAID group, or any other suitable set of storage space. The term aggregate as used herein means a logical object for managing storage space at one or more physical storage devices.

The storage system 108 may be used to store and manage information at storage devices 110/114 based on a request generated by server system 104, cloud-based validation utility 140, user 102 and/or a VM. The request may be based on file-based access protocols, for example, the Common Internet File System (CIFS) or the Network File System (NFS) protocol, over TCP/IP. Alternatively, the request may use block-based access protocols, for example, iSCSI or FCP.

As an example, in a typical mode of operation, server system 104 (or VMs 126A-126N) transmits one or more input/output (I/O) commands, such as an NFS or CIFS request, over connection system 116 to the storage system 108. Storage system 108 receives the request, issues one or more I/O commands to storage devices 110/114 to read or write the data on behalf of the server system 104 and issues an NFS or CIFS response containing the requested data over the connection system 116 to the respective server system 104.

In one aspect, storage system 108 may have a distributed architecture, for example, a cluster-based system that may include a separate network module and storage module (not shown). Briefly, the network module is used to communicate with host platform server system 104 and cloud-based validation utility 140, while the storage module is used to communicate with the storage devices 110/114 that are a part of a storage sub-system. Furthermore, various embodiments may include a distributed architecture for more than just the storage system 108. For instance, the system shown in FIG. 1 may span locations or a combination of on-premises and cloud resources. In fact, the system of FIG. 1 may include hybrid resources.

Storage system 108 maintains various data structures for storing information related to storage devices 110/114. For example, storage system 108 is aware of the identity and capabilities of storage device 110/114. Storage system 108 maintains the information regarding all the VMs and server systems that use storage device 110/114. This information may be provided to the cloud-based validation utility 140 for configuring a storage system to a CI environment, as described below in detail.

The cloud-based validation utility 140 may be implemented in one computing device or in a distributed environment among multiple computing systems. In one aspect, the cloud-based validation utility 140 is used to configure a CI system to a certified, CI configuration. Validation utility 140 may communicate with agent/handler 150, which may include an application that runs on an OS 128.

In one example, the cloud-based validation utility 140 executes a series of validation commands to check whether a CI system complies with CI environment configuration rules. The validation commands may be run in sequence. The commands determine if the rules for the command are met. If the rules are not met (i.e., a "failure"), then a description is provided of why they are not met and an option to "fix" the failure may also be provided to the user via a GUI.

The cloud-based validation utility 140 may store a rich document, which also may be referred to as "rdoc" in this example. The rdoc may include an internal data model that represents the CI 101, and each rdoc data collection includes a snapshot in time of the CI 101's state. In one example, the rdoc includes a listing of the various hardware and software components within CI 101, the items inside the components including settings, and indications of related components and settings. The cloud-based validation utility 140 may update the rdoc as often as is appropriate, such as each time an update is applied, a component is added or deleted, or settings are changed. Furthermore, updating the rdoc may be a push operation (wherein the CI 101 transmits a description of its state to the cloud-based validation utility 140), a pull operation (wherein the cloud-based validation utility polls the CI 101 for changes from time to time), or a combination thereof.

Thus, the rdoc includes the CI data model and analytics used to evaluate the rules where the results are stored in the rdocs along with input variables for remediation or "Converged Operation". In one example, the cloud-based validation utility 140 executes code to perform a validation operation, which compares the data in the rdoc to the various rules and to update the rdoc to identify failures. The cloud-based validation utility 140 may provide a graphical user interface (GUI) to the user to inform the user of the failures and to provide an option to the user to remediate those failures. Upon instruction by the user to remediate a particular failure, cloud-based validation utility 140 selects a schema corresponding to the failure, populates the schema with the appropriate parameters, and sends the filled-in schema to the agent/handler 150. An example schema includes structured data that is intended to provide agent/handler 150 with information to carry out the desired operation. For instance, if a particular operation requires multiple steps that must be performed in a particular order, then the schema itself may indicate those steps and that order. The schema may also identify a particular component a: CI 101 to be updated or changed. It may also include a tag that identifies scripts to be used to effectuate the changes.

The agent/handler 150 then selects an executable script that it runs against CI 101, thereby causing a configuration change of one or more nodes that remediates the failure. The agent/handler 150 may then also report back to the cloud-based validation utility that the requested remediation was performed.

Of course, the scope of embodiments is not limited to simply remediating a failure. Rather, various embodiments may be used to perform updates or other configuration changes as appropriate. For instance, if cloud-based validation utility 140 determines that an update is available for the CI 101, then it may flag the update in the same way that it flags a failure—by alerting the user on the GUI. The user may select the update, which causes the cloud-based validation utility 140 to dynamically generate a schema with specific parameters and operation tags leveraging cloud based data analytics and best practices that is passed to the agent/handler 150, which generates scripts and applies the scripts against the CI 101 to update one or more components. Similarly, the technique may be used to provision or delete storage or compute resources. For instance, the GUI may include an option to provision a storage volume. When the user selects the option to provision storage volume, the request is sent to the cloud-based validation utility 140, which generates a schema that is passed to the agent/handler 150, which generates scripts and applies the scripts against the CI 101 to provision the resource.

Figure 2:
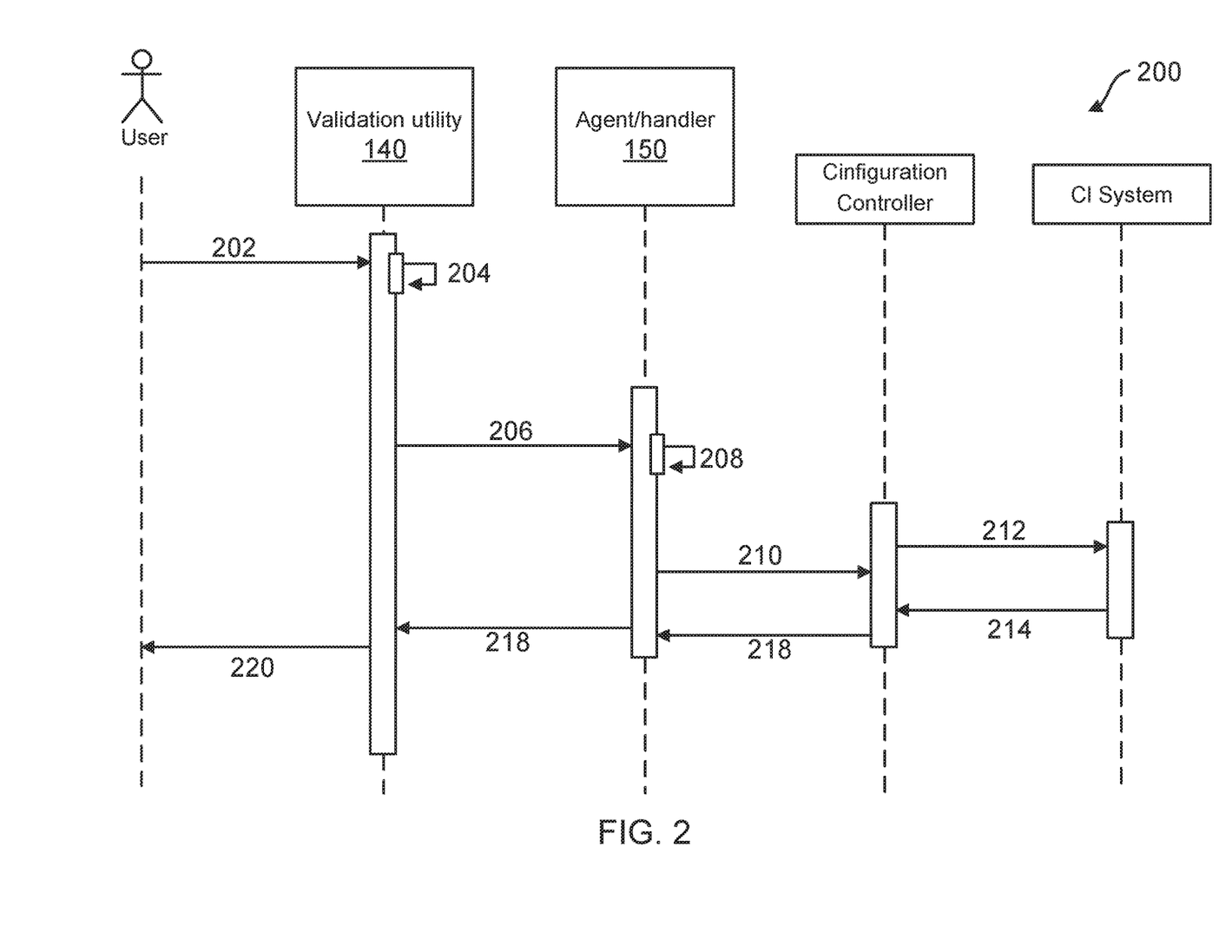
FIG. 2 illustrates an example process to remediate a rule failure within a converged infrastructure environment, according to one embodiment.

FIG. 2 is a signal diagram illustration of a method 200, which may be performed within CI 101, according to an embodiment. FIG. 2 illustrates a scenario in which a user (e.g., the "actor") seeks to remediate a failure in a converged infrastructure environment, such as CI 101. For instance, the validation utility 140 may have identified one or more failures and may have provided options for the user to remediate those failures. The user may interact with a GUI or other interface to select ones of the failures to remediate at action 202. An example of a failure that may be remediated may include identifying a domain name server (DNS), setting up iSCSI for a particular storage virtual machine (SVM), enabling use of a discovery protocol, such as Cisco Discovery Protocol or CDP, for a node, or the like. In fact, method 200 may be used to apply updates to a CI environment, scale or improve performance of the CI environment, or the like.

The example of FIG. 2 is described with respect to a particular working example, specifically, remedying a failure to enable a discovery protocol. However, it is understood that method 200 may be used generally to remediate any failure.

At action 202, the user requests to fix a failure regarding enabling a discovery protocol at a node. In this example, a node may include a piece of hardware or a piece of software within CI 101. At action 204, the validation utility 140 selects a schema from its multitude of schemas. For instance, when the validation utility 140 identified the error, each error corresponds to at least one schema that is saved by the validation utility 140. When the user requests to remediate the failure, validation utility 140 accesses the schema corresponding to that failure. The schema itself includes a template for generating an executable script as well as space reserved to be filled-in by any appropriate parameters. In this instance, a parameter may include the name of the node for which the discovery protocol should be enabled. Validation utility 140 is aware of the name of the node due to its validation analytics that identified the failure, so the validation utility 140 does not request the user to fill in the name of the node. However, in an instance in which a parameter is not readily identifiable by validation utility 140, it may prompt the user to manually enter the parameter.

At action 206, the validation utility 140 transmits the schema, filled-in with appropriate parameters, to the agent/handler 150. Upon receipt of the filled-in schema, the agent/handler 150 identifies a pre-stored script template that corresponds to the particular schema. For instance, the schema may include a tag that identifies the particular failure and, thus, identifies the schema as well. The schema may then be matched to a pre-stored script template using its tag. Thus, at actions 208 and 210, the agent/handler 150 selects an executable script and sends that executable script to the configuration controller, which may be a part of agent/handler 150 or may be separate from agent/handler 150 but is, in any event, part of the on-premises system. In this example, the executable scripts correspond to Ansible™ plays, though it is understood that various embodiments may use any configuration manager. Examples of configuration managers include Ansible™, Chef™, and Puppet™, among others.

At action 212, the agent/handler 150 runs the executable script against the CI environment, thereby causing the CI environment to configure itself. Continuing with this example, the failure includes a not enabled discovery protocol for the particular node. Accordingly, the executable script may cause the CI environment to enable that discovery protocol for the node. At actions 214-220, the CI system reports the results back through the chain so that the validation utility 140 and the user are apprised of the update. Although not shown in FIG. 2, validation utility 140 may keep logs and records of the updates, including modifying the rdoc to indicate the change made to remediate the failure.

FIG. 2 provides an example of making a configuration change in response to a rule failure. However, as noted above, this technique may be applied to updates, additions or omissions of resources, or any other desired changes to the CI environment. Thus, in one example, action 202 may include a user identifying a desired update via a GUI, action 204 may include the validation utility 140 generating a schema specifically for the requested update, and the remaining actions 206-220 being the same as described above.

Figure 3:
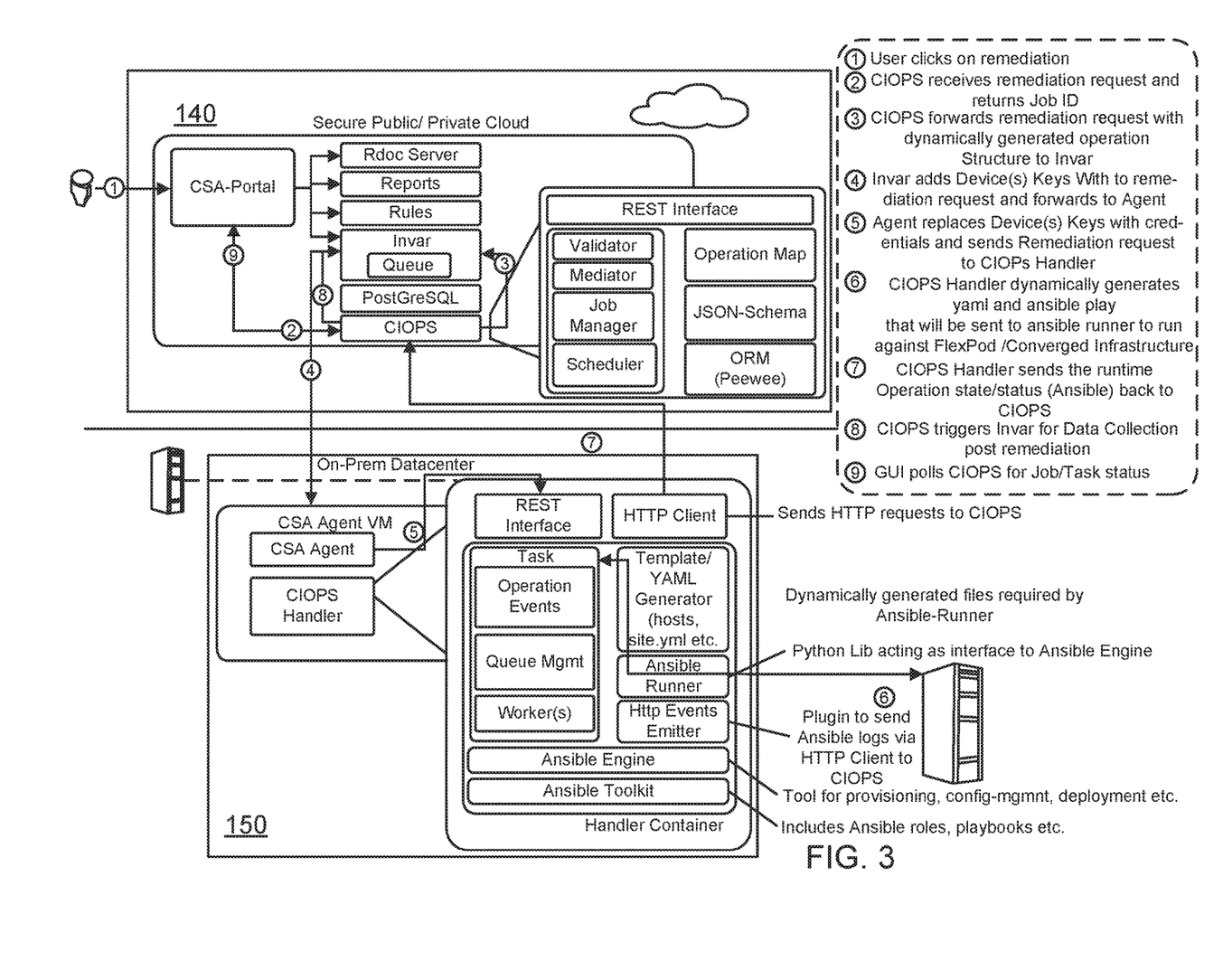
FIG. 3 illustrates an example process to remediate a rule failure within a converged infrastructure environment, according to one embodiment.

FIG. 3 is an illustration of an example method, which may be performed within CI 101, according to an embodiment. FIG. 3 also illustrates a scenario in which a user seeks to remediate a failure in a converged infrastructure environment, such as CI 101. FIG. 3 illustrates the actions of FIG. 2 as they occur within a converged infrastructure environment that uses an rdoc, REST interfaces, Python™, Ansible™, and YAML. Furthermore, examples of a cloud-based validation utility 140 and an agent/handler 150 are shown in FIG. 3, according to one example. However, it is understood that other embodiments may implement cloud-based validation utility 140 and agent/handler 150 differently than the specific embodiment shown in FIG. 3.

At action 1, the user selects remediation for a failure using a GUI or other interface at the converged systems advisor (CSA) portal within validation utility 140. At action 2, the validation utility 140 assigns remediation request to a particular job ID and also populates a selected schema with appropriate parameters (e.g., a name of a node). At actions 3-4, the validation utility 140 forwards a remediation request, including the filled-in schema, and a device key to the agent/handler 150. In this example, the validation utility 140 does not have credentials to access the particular devices within the CI and, instead, uses keys that identify particular devices or nodes. The agent/handler 150 may then replace the keys with the appropriate credentials. It should be noted in this example that the credentials are not transmitted to the cloud and do not otherwise leave the on-premises site.

At action 5, the agent/handler 150 replaces the keys with the credentials. At action 6, the agent/handler selects an executable template corresponding to the schema and fills the executable template in with the appropriate parameters from the schema. Further in action 6, the agent/handler 150 runs the executable against the CI to make the requested change.

At action 7, the agent/handler sends the runtime operation state/status back to validation utility 140, where the state/status indicates the change made and the current state of the CI. At action 8, the validation utility 140 triggers a data collection for logs, and at action 9, the portal polls for additional remediation jobs.

Figure 4:
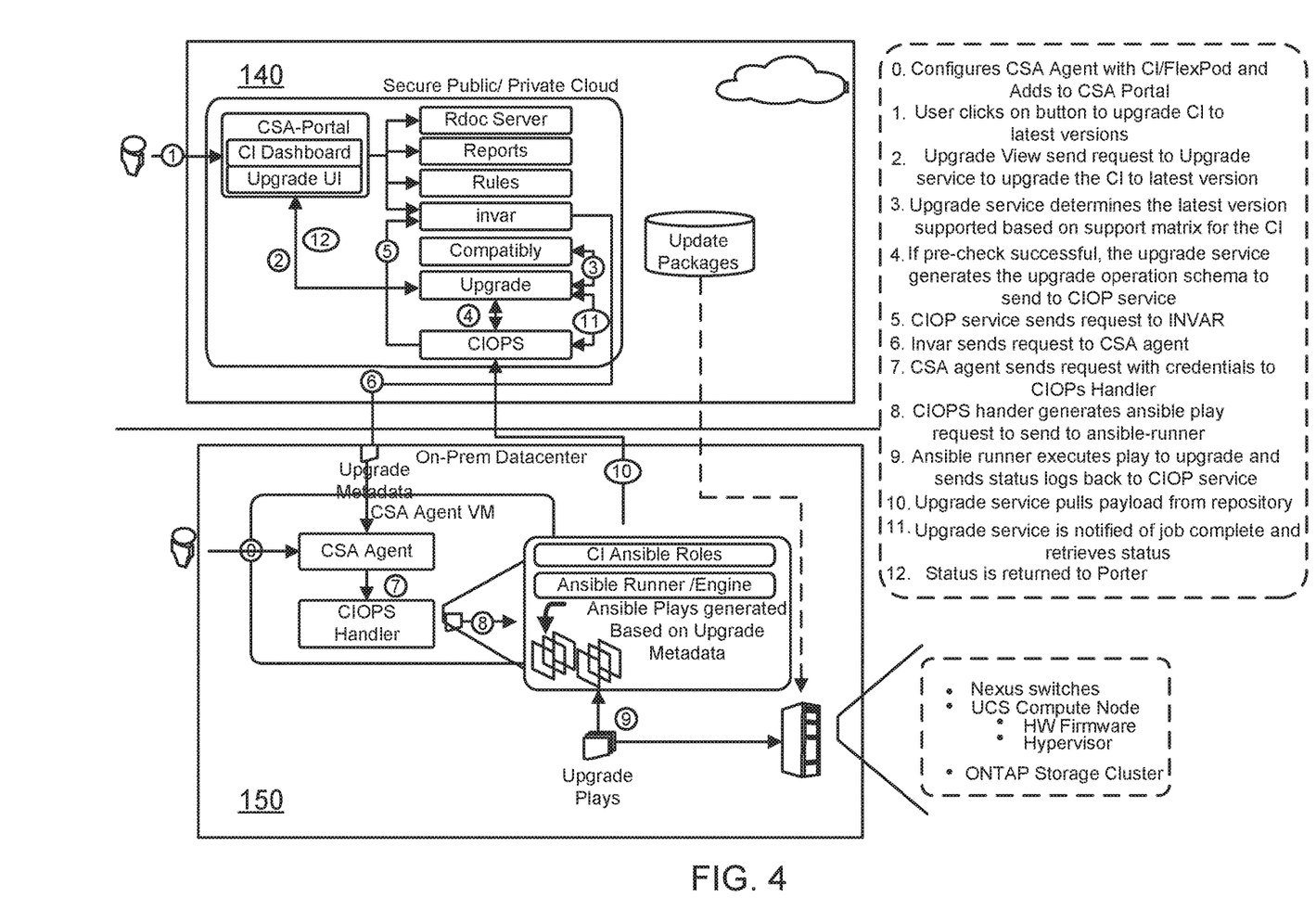
FIG. 4 illustrates an example process to update a converged infrastructure environment, according to one embodiment.

FIG. 4 is an illustration of an example method, which may be performed within CI 101, according to an embodiment. FIG. 4 illustrates a scenario in which a user updates a CI, such as CI 101, using a same or similar method as that described above with respect to FIGS. 2 and 3. As with FIG. 3, FIG. 4 illustrates actions as they occur within a converged infrastructure environment that uses an rdoc, REST interfaces, Python™, Ansible™, and YAML. Furthermore, examples of a cloud-based validation utility 140 and an agent/handler 150 are shown in FIG. 4, according to one example. However, it is understood that other embodiments may implement cloud-based validation utility 140 and agent/handler 150 differently than the specific embodiment shown in FIG. 4.

At action 1, the user is presented with an option to update the CI environment and chooses that option using, e.g., a GUI or other interface. At action 2, the portal sends the request to an upgrade service. At action 3, the upgrade service determines the latest version supported based on a support matrix for the CI.

At action 4, the validation utility 140 generates a schema. If the update is large, then the schema may be large as well and may have many parameters that may be filled-in through the validation process and/or manually by the user. In this example, the schema is similar to the schemas described above with respect to FIGS. 2 and three. Specifically, the schema of FIG. 4 specifically corresponds to the update and also corresponds to one or more executables that implement the changes according to the update. In some embodiments, each CI version update may be accompanied by an updated schema, which is drafted to cause the appropriate executables to be generated.

Actions 5-6, the validation utility 140 sends the filled-in schema to the agent/handler 150, and at action 7 the handler replaces any keys with credentials. At action 8, the agent/handler generates the executables by following instructions within the schema to select one or more corresponding executables and fills those executables in with any appropriate parameters. At action 9, the agent/handler executes the executables against the CI to make the requested changes and send status logs back to the validation utility 140. At actions 10-12, the validation utility 140 and the agent/handler record the updates as appropriate (e.g., at rdocs and status logs).

Referring to FIGS. 2-4, the system has coded functionality in it that can 1) validate a system to determine whether a converged system conforms to a set of rules, 2) notify the user via a UI that some aspects are not conforming, 3) upon instruction by the user to fix, select a schema and fill the schema in with parameters to make structured data, 4) send the structured data to the agent to create an executable, where the agent includes templates (e.g., for Ansible™ plays) that can incorporate the structured data, 5) send the executable to the converged system and execute that executable to make the particular change, 6) keep logs and track that the change was actually made, and 7) inform the user that the change was made.

Each rule remediation may be backed by an automation script known as an Ansible™ play, in some embodiments. For the embodiments of FIGS. 2-4, the techniques include creating Ansible™ roles with tags that will allow mapping to generate plays that will remediate a rule or perform a converged operation.

For each rule that can be remediated, the following actions may be used as input to the cloud-based SaaS system:

1) Identify what are automation constructs (roles, tasks and variables) to remediate rule or perform converged operation.

2) Provide tags associated with the automation constructs for each of the tasks for the converged operation.

3) Capture the input variables for the resulting automation based on the tags.

4) Create converged operation structured schema (e.g., json) to allow the SaaS system to translate converged operations into requirements to run the automation (input variables, tags, etc.). Depending on input variable type, values may be fetched intelligently from the known best practices (e.g., rules) associated with each analytics/rule result or the user may be requested to enter some input variables that meet json requirements for automation/Ansible™ play.

In some examples, the cloud-based SaaS system has one or more of the following specifications:

1) For rules that can be remediated or corrected by automation, add converged operation input data required to remediate the rule. A benefit of some embodiments is minimizing the user input required so that the solution reduces user error and complexity based on analytics already performed on each rule.

2) Given the converged operation structured data, the system may correlate converged operation appropriately to failed rules.

3) When either the user selects to execute the converged operation and/or system is authorized to auto correct the failed rule, the converged operation structure data and the converged operation data associated with the failed rule is used to dynamically generate the automation prescribed for the infrastructure.

4) Push to automation request to on-premises agent/gateway.

5) Add credentials securely to automation engine with generated data from SaaS system.

6) Report results back to SaaS system includes verification that the analytics produces successful results.

The same mechanism may be used to automate the actions that can be taken on the converged infrastructure as single system. This includes ability to upgrade and scale the CI system.

Figure 5:
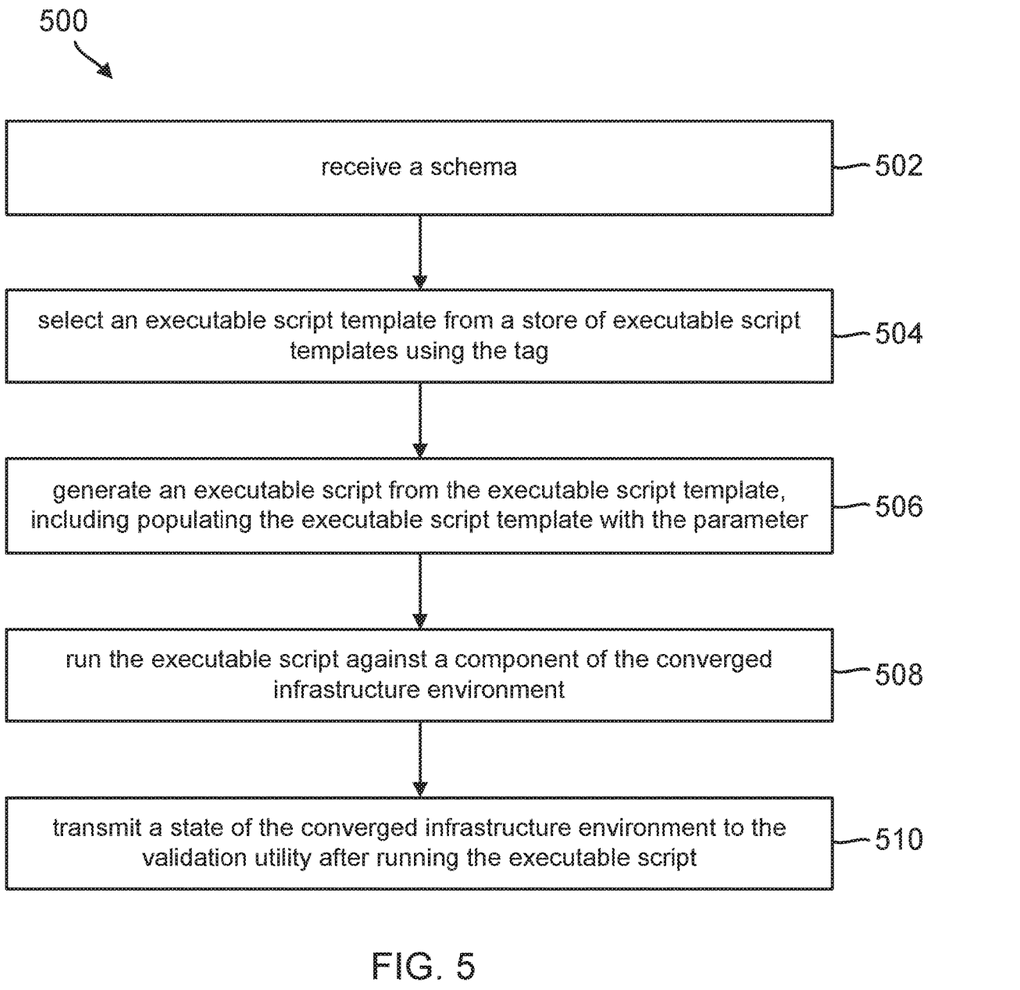
FIG. 5 illustrates an example process that may be performed on-premises by a converged infrastructure environment, according to one embodiment.

FIG. 5 is an illustration of an example method that may be performed by CI 101 of FIGS. 1A, B and 2. Specifically, method 500 may be performed by an application running on a virtual operating system within server 104, according to one embodiment. However, method 500 may be performed by any suitable computing component within the on-premises portion of CI 101 by executing code on computer readable media to cause one or more computers to perform the actions of method 500.

Although not shown in method 500, various embodiments may include a GUI that presents options to a user, where some of the options may include remediating a rule failure, updating the converged infrastructure system, changing a configuration of the converged infrastructure system, and the like. When the user selects one of the options, it may trigger a cloud-based service to generate a schema, which may include structured data, as described in more detail below. In this example, the GUI and the schema generating may be provided by a cloud-based service before action 502.

At action 502, the computing component receives the schema. In one example, the schema is a portion of structured data, which indicates a change to be made to the converged infrastructure system. For instance, the schema may indicate a plurality of actions to perform on one or more components of the converged infrastructure system, and the schema may even indicate an order in which the actions are to be performed. Examples of actions that may be performed include changing a setting, adding or deleting a software component, provisioning or deleting a storage resource or virtualization resource, updating a software component, and the like.

The schema may also include a tag, which may include information to identify the schema itself and also to identify a script template that corresponds to the schema. For instance, the tag may be set by a cloud-based service that works in tandem with the on-premises computer system to keep the converged infrastructure environment configured and updated. The cloud-based service may have a plurality of pre-stored actions that may be performed on a converged infrastructure environment, where each of the pre-stored actions corresponds to a tag. Similarly, the on-premises computing device may communicate with storage which has a plurality of script templates stored, where the script templates also correspond to tags.

The schema may also include a parameter, where an example of a parameter may include an identification of a component within the converged infrastructure environment. In other words, the parameter may indicate an item on which the change is to be made. An example of action 502 includes actions 204 and 206 of FIG. 2.

At action 504, the on-premises computing device selects an executable script template from a store of executable script templates using the tag.

Action 506, the on-premises computing device generates an executable script from the executable script template. For instance, action 506 may include populating the executable script template with the parameter. In other words, the executable script may include lines of computer code, executable by one or more components of the converged infrastructure environment, and specifying a component to be changed.

At action 508, the on-premises computing device runs the executable script against a component that is the object of the change. Of course, various embodiments may include a given schema and script directing changes on a multitude of different components. The executable script may change a setting at a component, add or delete a software component, update a software component, and the like.

At action 510, the on-premises computing device transmits a state of the converged infrastructure environment to the cloud-based service. For instance, if a change to a setting was made, the on-premises computing device made transmit a message to the cloud-based service that indicates the setting change. This may permit the cloud-based service to update its own records to reflect a current state of the converged infrastructure environment.

Figure 6:
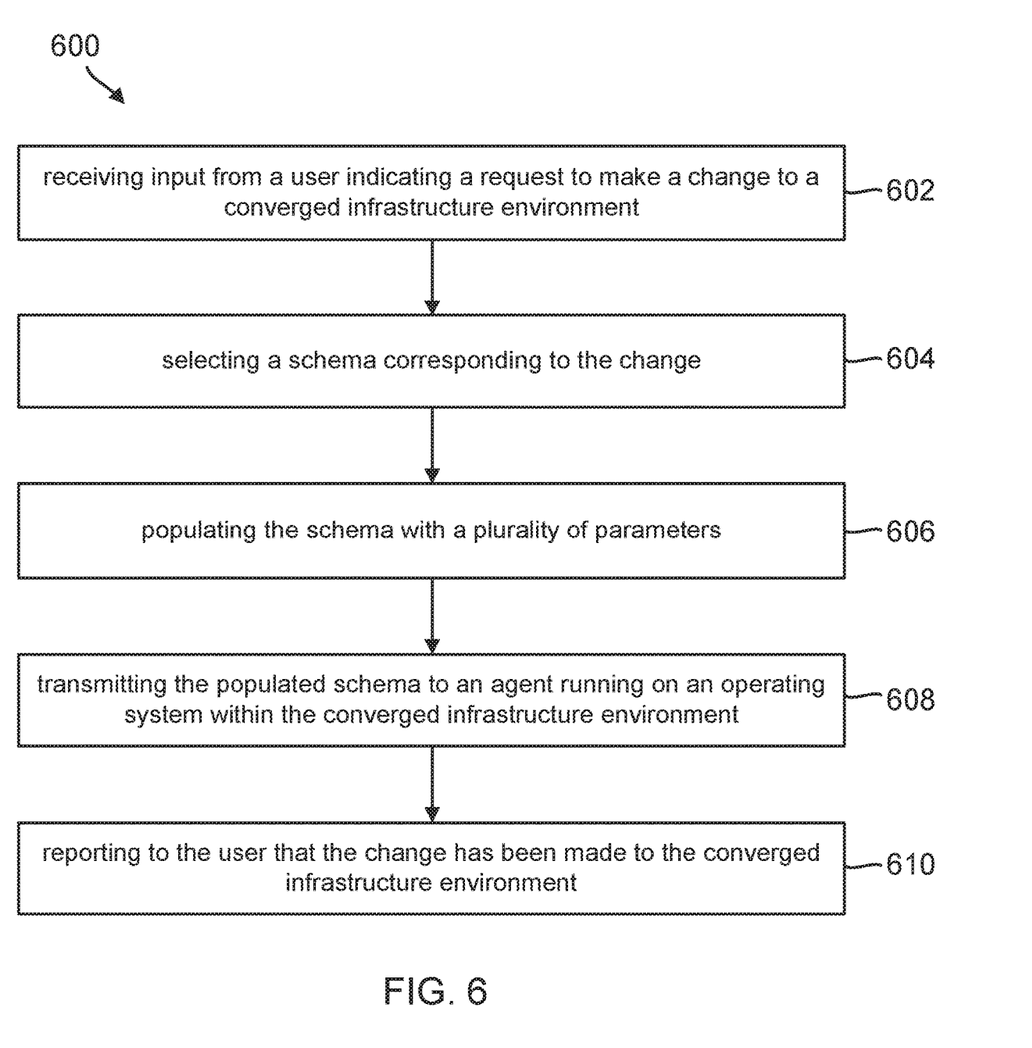
FIG. 6 illustrates an example process that may be performed by a cloud-based service, according to one embodiment.

FIG. 6 is an illustration of example method 600, which may be performed by a cloud-based service, such as cloud-based validation utility 140 of FIGS. 1A, B, and 2. For instance, one or more cloud servers may execute code on computer readable media to cause the one or more cloud servers to perform the actions of method 600.

At action 602, the cloud-based service may receive input from a user indicating a request to make a change to a converged infrastructure environment. The change may include a fix for a rule failure, a software update, or any other desired configuration for the converged infrastructure environment. The request may be received from an on-premises component of the converged infrastructure environment.

At action 604, the cloud-based service may select a schema corresponding to the change. Schemas are described in more detail above. The schema may correspond to one or more of a set of pre-programmed changes that may be made to the converged infrastructure environment. Also, the schema may indicate a plurality of different operations to be performed on a plurality of different components within the converged infrastructure environment and an order of the operations. The schema also corresponds to a script template of the converged infrastructure environment. In some examples, the schema may include a tag that identifies the schema and its correspondence to a script template.

At action 606, the cloud-based service populates the schema with a plurality of parameters applicable to the converged infrastructure environment. For instance, the parameters may identify hardware and software components.

At action 608, the cloud-based service may transmit the populated schema to an agent running on an operating system within the converged infrastructure environment.

At action 610, the cloud-based service may report to the user that the change has been made to the converged infrastructure environment. In some examples, the cloud-based service may receive a verification from the agent at the converged infrastructure environment that the changes have been made, and in the cloud-based service may report the change to the user by any appropriate manner, including by GUI.

The scope of embodiments is not limited to the series of actions shown in FIGS. 5 and 6. Rather, various embodiments may add, omit, rearrange, or modify one or more actions. For instance, various embodiments may include performing methods 500 and 600 periodically or at desired times. Furthermore, methods 500 and 600 may be performed to provide fixes for rule failures, software updates, or other desired changes.

What is claimed is:

1. A non-transitory machine readable medium having stored thereon instructions for performing a method comprising machine executable code which when executed by at least one machine, causes the machine to:
    receive a schema with a tag and a parameter, the schema representing a change to be made to a converged infrastructure environment, wherein the schema is received from a cloud-based service to the on-site converged infrastructure environment;
    select an executable script template from a store of executable script templates using the tag;
    generate an executable script from the executable script template, including populating the executable script template with the parameter; and
    run the executable script against a component of the converged infrastructure environment.

2. The non-transitory machine readable medium of claim 1, wherein the code further causes the machine to:
    transmit a state of the converged infrastructure environment to the cloud-based service after running the executable script.

3. The non-transitory machine readable medium of claim 1, wherein the schema is received at an on-premises data center of the converged infrastructure environment.

4. The non-transitory machine readable medium of claim 1, wherein the parameter identifies the component.

5. The non-transitory machine readable medium of claim 1, wherein the schema identifies a plurality of actions to be performed on the component.

6. The non-transitory machine readable medium of claim 1, wherein the schema identifies a plurality of actions in a specific order to be performed on the component.

7. The non-transitory machine readable medium of claim 1, wherein the component comprises an item selected from the list consisting of:
    a compute resource;
    a virtualization resource
    a storage resource; and
    a networking resource.

8. The non-transitory machine readable medium of claim 1, wherein the executable script comprises a fix for a configuration failure.

9. The non-transitory machine readable medium of claim 1, wherein the executable script comprises an update for the component.

10. A method comprising:
    receiving input from a user indicating a request to make a change to a converged infrastructure environment, wherein the request is received from an on-premises component of the converged infrastructure environment and is received at a cloud-based service;
    selecting a schema corresponding to the change, wherein the schema includes an identification of an operation to be performed on the converged infrastructure environment and corresponds to a script template at the converged infrastructure environment;
    populating the schema with a plurality of parameters applicable to the converged infrastructure environment;
    transmitting the populated schema to an agent running on an operating system within the converged infrastructure environment; and
    reporting to the user that the change has been made to the converged infrastructure environment.

11. The method of claim 10, wherein the request to make a change comprises a request to remediate a rule failure.

12. The method of claim 10, wherein the request to make a change comprises a request to apply a software update to the converged infrastructure environment.

13. The method of claim 10, wherein the request to make a change comprises a request to provision a storage resource in the converged infrastructure environment.

14. The method of claim 10, wherein a first parameter of the plurality of parameters includes a name of the node.

15. The method of claim 10, further comprising: comparing a state of the converged infrastructure environment against a set of rules to identify a rule failure.

16. The method of claim 10, wherein populating the schema with the plurality of parameters comprises automatically populating the schema using parameters discovered during validation of the converged infrastructure environment.

17. A computing device comprising:
    a memory containing machine readable medium comprising machine executable code having stored thereon instructions for performing a method of changing a converged infrastructure environment;
    a processor coupled to the memory, the processor configured to execute the machine executable code to cause the processor to:
    receive a schema with a tag and a parameter, the schema representing a change to be made to a converged infrastructure environment, wherein the schema is received from a cloud-based service to the on-site converged infrastructure environment;
    select an executable script template from a store of executable script templates using the tag;
    generate an executable script from the executable script template, including populating the executable script template with the parameter; and
    run the executable script against a component of the converged infrastructure environment.

18. The computing device of claim 17, wherein the processor is further configured to:
    transmit a state of the converged infrastructure environment to the cloud-based service after running the executable script.

19. The computing device of claim 17, wherein the schema is received at an on-premises data center of the converged infrastructure environment.

20. The computing device of claim 17, wherein the schema identifies a plurality of actions in an order to be performed on the component.

\* \* \* \* \*